United States Patent [19]

Corr et al.

[11] Patent Number: 4,963,210
[45] Date of Patent: Oct. 16, 1990

[54] METHOD OF MAKING ELONGATE ARTICLES HAVING HIGH DIMENSIONAL STABILITY

[75] Inventors: Horst Corr, Übach-Palenberg; Rudolf Hackenberg, Langerwehe-Jüngersdorf; Bernd-Horst Schmitz, Stolberg, all of Fed. Rep. of Germany

[73] Assignee: URANIT GmbH, Jülich, Fed. Rep. of Germany

[21] Appl. No.: 353,496

[22] Filed: May 18, 1989

[30] Foreign Application Priority Data

May 20, 1988 [DE] Fed. Rep. of Germany ....... 3817174

[51] Int. Cl.$^5$ .................... B31C 13/00; B65H 81/00
[52] U.S. Cl. .................... 156/172; 156/169; 138/109; 138/130; 464/181; 464/903
[58] Field of Search ............ 156/169, 172, 173, 175; 464/181–183, 903; 264/257, 258; 138/109, 130

[56] References Cited

U.S. PATENT DOCUMENTS

| | | | |
|---|---|---|---|
| 3,417,786 | 12/1968 | Schnabel | 138/109 X |
| 4,171,626 | 10/1979 | Yates et al. | 156/173 X |
| 4,248,062 | 2/1981 | McLain et al. | 156/173 X |
| 4,287,495 | 9/1981 | Lund, Jr. et al. | 333/229 X |
| 4,664,644 | 5/1987 | Kumata | 156/172 X |
| 4,695,340 | 9/1987 | Matuska | 156/172 X |

FOREIGN PATENT DOCUMENTS 3135585 3/1983 Fed. Rep. of Germany.

Primary Examiner—Michael W. Ball
Assistant Examiner—Jeff H. Aftergut
Attorney, Agent, or Firm—Spencer & Frank

[57] ABSTRACT

A method of producing an elongate article comprises the step of providing, by winding a filament, a plurality of superposed layers to form a hollow cylinder having open ends. At least one of the layers is formed of a circumferential winding and at least one of the layers is formed of a cross winding. The cross winding has fibers having a negative coefficient of thermal expansion and is oriented at a predetermined inclined angle to the cylinder axis. The method further comprises the step of securing to the open ends of the hollow cylinder end pieces comprised of a material having a high surface hardness and dimensional stability. The inclined angle has such a magnitude that temperature-caused changes in the axial length of the hollow cylinder compensate for temperature-caused changes in the axial length of the end pieces.

7 Claims, 1 Drawing Sheet

METHOD OF MAKING ELONGATE ARTICLES HAVING HIGH DIMENSIONAL STABILITY

REFERENCE TO RELATED APPLICATION

This application claims the priority of Federal Republic of Germany Application No. P 38 17 174.0 filed May 20, 1988, which is incorporated herein by reference.

BACKGROUND OF THE INVENTION

1. Field of the Invention

The present invention relates to a method of producing elongate articles having high dimensional stability and low thermal expansion, such as length measuring tools, particularly final or calibrating gauges, calipers or testing or sensing members, by using hollow cylinders made of composite fiber materials and fibers which have a negative coefficient of thermal expansion. The invention also relates to the elongate articles so produced.

2. Description of the Related Art

An elongate article in the form of a length measuring tool is described in German Patent Document No. 3,135,585. The article disclosed therein is composed of a ceramic or fiber reinforced material, such as carbon fiber and glass fiber reinforced plastics. It is further disclosed that the different types of carbon fibers used have either a small positive or a small negative coefficient of thermal expansion while the glass fibers used have a comparatively high positive coefficient of thermal expansion, and that measuring tools made of these materials are dimensionally stable and subject to only slight thermal expansion.

SUMMARY OF THE INVENTION

It is an object of the present invention to provide improved elongate articles, and an improved method of making such articles, that are suitable for use as length measuring tools, particularly final gauges, testing devices or sensing devices that do not substantially change in length due to fluctuating temperatures.

These objects and others to become apparent as the specification progresses, are accomplished by the invention, according to which, briefly stated, the articles are made by providing, by winding a filament, a plurality of superposed layers to form a hollow cylinder having open ends. At least one of the layers is formed of a circumferential winding and at least one of the layers is formed of a cross winding. The cross winding has fibers having a negative coefficient of thermal expansion and is oriented at a predetermined inclined angle to the cylinder axis. The method further comprises the step of securing to the open ends of the hollow cylinder end pieces comprised of a material having a high surface hardness and dimensional stability. The inclined angle has such a magnitude that temperature-caused changes in the axial length of the hollow cylinder compensate for temperature-caused changes in the axial length of the end pieces.

Since carbon fibers and aramid fibers have a negative coefficient of thermal expansion in their longitudinal direction, hollow cylinders having cross windings made of these fibers tend to shorten at elevated temperatures. However, this shortening is counteracted by the plastic matrix and the end pieces by virtue of their positive coefficient of thermal expansion so that, with the correct selection of the winding angle, a compensation occurs; that is, in spite of an increase in temperature, the article retains its overall length. For similar reasons, the article also retains its length when there is a reduction in temperature.

The optimum winding angle depends on the coefficient of thermal expansion of the fibers employed. For carbon fibers the winding angle measured, with reference to the longitudinal axis of the hollow cylinder, should be set lower than for aramid fibers since the negative coefficient of expansion is greater for aramid fibers.

DESCRIPTION OF THE PREFERRED EMBODIMENTS

Figure 1:
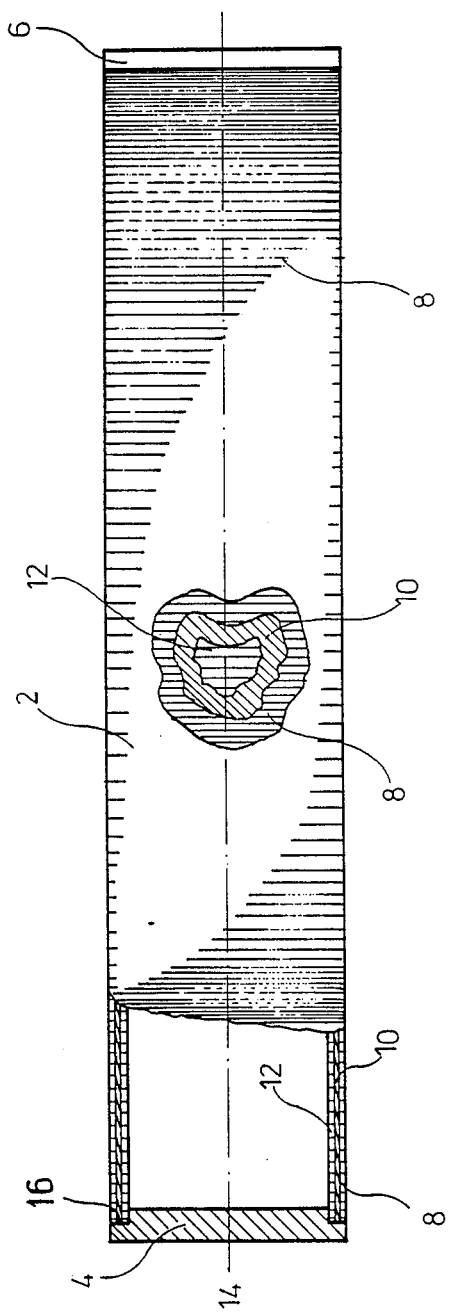
FIG. 1 is a partially sectional broken-away side elevational view of a preferred embodiment.

The invention will now be described with reference to an embodiment that is illustrated in the drawings.

FIG. 1 is a schematic representation of a calibrating or final gauge generally designated at 1, composed of a hollow cylinder 2 made of carbon fiber reinforced plastic (CFRP) and two end pieces 4 and 6 at the ends of the cylinder. The end pieces are preferably made of a nickel-iron alloy of the Invar type containing 35%-37% nickel.

Figure 2:
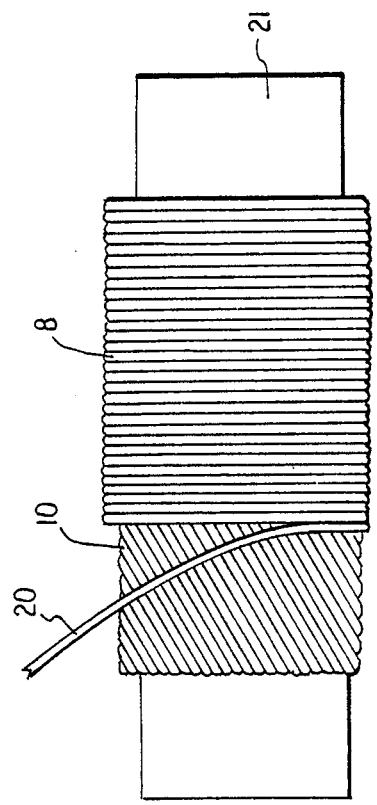
FIG. 2 is a side elevational view of a method according to a preferred embodiment.

One end of the gauge 1 is shown in axial section and part of the gauge is broken away to show an external circumferential layer 8, a cross wound layer 10 beneath the circumferential layer 8 and an internal circumferential layer 12 beneath the cross wound layer 10. In a preferred method of forming the hollow cylinder 2, the alternating layers of circumferential windings 8 and 12 and cross winding 10 are formed by the well known mandrel winding techniques such as winding a filament 20 around a mandrel 21 as shown diagrammatically in FIG. 2. In the circumferential layers 8 and 12 the filaments are oriented at substantially 90° to the cylinder axis 14, whereas the filaments of the cross wound layer 10 are oriented at an inclined angle with positive and negative orientation to the axis 14, as will be described below. The superposed windings are removed from the winding mandrel once the plastic has hardened.

In case the plastic saturated carbon fiber is used for the cross winding 10, the latter has a winding angle between 15° and 25°, preferably between 18° and 20° with respect to the longitudinal axis 14 of the hollow cylinder. If aramid fibers are employed, the orientation of the cross winding 10 to the cylinder axis 14 should be at a greater angle, preferably about 30°. The end pieces 4 and 6 are provided with an external annular recess 16 with which they are fitted into the ends of the hollow cylinder 2 and bonded with an adhesive thereto. A measuring tool made as described having a length 5 of about 450 mm and a wall thickness of 2.5 mm has an absolute coefficient of thermal expansion of $|\alpha| < 2 \times 10^{-7}$ m/m°C. In spite of its low weight, the tool is extremely stable dimensionally and is resistant to bending.

The method according to the invention can also be used to produce calipers, extension pieces which are screwed together by means of coupling members and testing or sensing members. The end pieces may also have the shape of rounded caps or spheres and instead of Invar, they may be composed of a ceramic material, such as a glass ceramic or of quartz glass. It is of importance that in all cases the thermal expansion of the end pieces is compensated for by a suitable selection of the winding angle of the wound fibers for the cross windings under consideration of the negative coefficient of thermal expansion of the fiber material. For carbon fibers, the ratio of cross layers to circumferential layers should be more than 2:1, preferably about 3:1 and for aramid fibers it is preferably 1:2. If necessary, fibers having a positive coefficient of thermal expansion with respect to their longitudinal extent, for example, glass fibers, can also be employed for the circumferential windings.

It will be understood that the above description of the present invention is susceptible to various modifications, changes and adaptations, and the same are intended to be comprehended within the meaning and range of equivalents of the appended claims.

What is claimed is:

1. A method of producing an elongate article comprising the steps of:

(a) providing a plurality of superposed layers composed of a wound filament in a plastic matrix to form a hollow cylinder having open ends and a cylinder axis parallel to a length of the cylinder at least one of the layers being formed of a circumferential winding and at least one of the layers being formed of a cross winding; said cross winding comprising fibers having a negative coefficient of thermal expansion; said cross winding being oriented at an inclined angle to the cylinder axis; and (b) securing the open ends of the hollow cylinder end pieces; said end pieces having a length measured parallel to the cylinder axis, and said inclined angle having such a magnitude that temperature-causes changes in the length of the hollow cylinder compensate for temperature-caused changes in the length of the end pieces so that the hollow cylinder expands when the end pieces contract during a decrease in temperature and so that the hollow cylinder contracts when the end pieces expand during an increase in temperature.

2. A method as defined in claim 1, wherein said cross winding comprises carbon fibers, and said inclined angle is 15° to 25°.

3. A method as defined in claim 2, wherein said inclined angle is 18° to 20°.

4. A method as defined in claim 1, wherein said cross winding comprises aramid fibers, and said inclined angle is about 30°.

5. The method of claim 1, wherein the ned pieces comprise a metal.

6. The method of claim 1, wherein the end pieces comprise a nickel-iron alloy.

7. The method of claim 1, wherein the end pieces comprise a nickel-iron alloy including 35% to 37% nickel.

* * * * *